(12) United States Patent
Nunome et al.

(10) Patent No.: US 8,652,690 B2
(45) Date of Patent: Feb. 18, 2014

(54) LITHIUM PRIMARY BATTERY

(75) Inventors: Jun Nunome, Kyoto (JP); Fumio Kato, Osaka (JP); Toshiyuki Shimizu, Osaka (JP)

(73) Assignee: Panasonic Corporation, Osaka (JP)

( * ) Notice: Subject to any disclaimer, the term of this patent is extended or adjusted under 35 U.S.C. 154(b) by 136 days.

(21) Appl. No.: 13/509,714

(22) PCT Filed: Nov. 1, 2011

(86) PCT No.: PCT/JP2011/006115
§ 371 (c)(1),
(2), (4) Date: May 14, 2012

(87) PCT Pub. No.: WO2012/063429
PCT Pub. Date: May 18, 2012

(65) Prior Publication Data
US 2012/0308901 A1  Dec. 6, 2012

(30) Foreign Application Priority Data

Nov. 12, 2010 (JP) ................. 2010-254115

(51) Int. Cl.
*H01M 6/16* (2006.01)
(52) U.S. Cl.
USPC ....................................... 429/335
(58) Field of Classification Search
None
See application file for complete search history.

(56) References Cited

U.S. PATENT DOCUMENTS

| | | |
|---|---|---|
| 4,489,144 A | 12/1984 | Clark |
| 5,290,414 A | 3/1994 | Marple |
| 5,432,030 A | 7/1995 | Vourlis |
| 5,514,491 A | 5/1996 | Webber |
| 6,255,021 B1 | 7/2001 | Kusumoto et al. |
| 6,641,957 B1 | 11/2003 | Kawaguchi et al. |
| 2005/0095508 A1 | 5/2005 | Yamamoto |

FOREIGN PATENT DOCUMENTS

| | | |
|---|---|---|
| JP | 57-174870 | 10/1982 |
| JP | 59-181464 | 10/1984 |
| JP | 07-254414 | 10/1995 |
| JP | 07-254435 | 10/1995 |
| JP | 11-054132 | 2/1999 |
| JP | 2005-141998 | 6/2005 |
| JP | 2007-066826 | 3/2007 |
| JP | 2008-305705 | 12/2008 |
| WO | WO 01/41247 A1 | 6/2001 |
| WO | WO 2010/014194 A1 | 2/2010 |

OTHER PUBLICATIONS

International Search Report issued in International Patent Application No. PCT/JP2011/006115 dated Feb. 7, 2012.

*Primary Examiner* — Milton I Cano
*Assistant Examiner* — Carmen Lyles-Irving
(74) *Attorney, Agent, or Firm* — McDermott Will & Emery LLP

(57) ABSTRACT

Reducing an initial voltage degrades intermediate-load discharge performance.
In a lithium primary battery containing iron disulfide as a positive electrode active material, a solvent of a nonaqueous electrolyte contains DIOX and DME as main components, and further contains THF. Moreover, the content of THF is 20 vol. % or lower.

6 Claims, 4 Drawing Sheets

FIG.2

| | ELECTROLYTE | | | | | | | | INITIAL VOLTAGE (V) | DISCHARGE PERFORMANCE (INDEX) | |
|---|---|---|---|---|---|---|---|---|---|---|---|
| | COMPOSITION OF SOLVENT (VOL.%) | | | | ADDITIVE (MASS%) | | SOLUTE | BINDER | | INTERMEDIATE LOAD | HIGH LOAD |
| | DIOX | DME | THF | 3Me2Ox | DMI | FIM | | | | | |
| BATTERY 1 | 60 | 40 | 0 | — | — | — | LiI | PTFE | 1.80 | 100 | 100 |
| BATTERY 2 | 60 | 40 | 0 | — | 0.2 | — | | | 1.70 | 98 | 97 |
| BATTERY 3 | 0 | 50 | 0 | 50 | 0.2 | — | | | 1.79 | 96 | 90 |
| BATTERY 4 | 40 | 30 | 0 | 30 | 0.5 | — | | | 1.79 | 96 | 92 |
| BATTERY 5 | 59.4 | 39.6 | 1 | | | | LiI | PTFE | 1.75 | 102 | 100 |
| BATTERY 6 | 57 | 38 | 5 | | | | | | 1.73 | 104 | 99 |
| BATTERY 7 | 55.2 | 36.8 | 8 | | | — | | | 1.71 | 105 | 98 |
| BATTERY 8 | 54 | 36 | 10 | | | | | | 1.70 | 104 | 97 |
| BATTERY 9 | 51 | 34 | 15 | | | | | | 1.69 | 102 | 96 |
| BATTERY 10 | 48 | 32 | 20 | | | | LiI | PTFE | 1.67 | 101 | 96 |
| BATTERY 11 | 45 | 30 | 25 | | | — | | | 1.66 | 99 | 92 |
| BATTERY 12 | 50 | 25 | 25 | | | | | | 1.69 | 99 | 90 |
| BATTERY 13 | 42 | 28 | 30 | | | | | | 1.66 | 98 | 89 |
| BATTERY 14 | 40 | 19 | 41 | | | | | | 1.65 | 98 | 87 |
| BATTERY 15 | 35 | 20 | 45 | | | | | | 1.64 | 96 | 85 |

FIG.3

| | ELECTROLYTE | | | | | | | INITIAL VOLTAGE (V) | DISCHARGE PERFORMANCE (INDEX) | |
|---|---|---|---|---|---|---|---|---|---|---|
| | COMPOSITION OF SOLVENT (VOL.%) | | | ADDITIVE (MASS%) | | SOLUTE | BINDER | | | |
| | DIOX | DME | THF | DMI | FIM | | | | INTERMEDIATE LOAD | HIGH LOAD |
| BATTERY 16 | 35 | 64 | 1 | — | — | LiI | PTFE | 1.75 | 100 | 97 |
| BATTERY 17 | 40 | 59 | 1 | | | | | 1.75 | 101 | 99 |
| BATTERY 18 | 80 | 19 | 1 | | | | | 1.74 | 102 | 95 |
| BATTERY 19 | 85 | 14 | 1 | | | | | 1.74 | 100 | 93 |
| BATTERY 20 | 30 | 65 | 5 | — | — | LiI | PTFE | 1.73 | 100 | 97 |
| BATTERY 21 | 35 | 60 | 5 | | | | | 1.73 | 100 | 97 |
| BATTERY 22 | 40 | 55 | 5 | | | | | 1.73 | 102 | 96 |
| BATTERY 23 | 50 | 45 | 5 | | | | | 1.72 | 103 | 97 |
| BATTERY 24 | 65 | 30 | 5 | | | | | 1.73 | 104 | 97 |
| BATTERY 25 | 70 | 25 | 5 | | | | | 1.72 | 103 | 96 |
| BATTERY 26 | 75 | 20 | 5 | | | | | 1.74 | 102 | 95 |
| BATTERY 27 | 80 | 15 | 5 | | | | | 1.73 | 101 | 95 |
| BATTERY 28 | 35 | 55 | 10 | — | — | LiI | PTFE | 1.71 | 100 | 96 |
| BATTERY 29 | 40 | 50 | 10 | | | | | 1.69 | 103 | 98 |
| BATTERY 30 | 50 | 40 | 10 | | | | | 1.70 | 104 | 97 |
| BATTERY 31 | 60 | 30 | 10 | | | | | 1.70 | 104 | 96 |
| BATTERY 32 | 75 | 15 | 10 | | | | | 1.71 | 101 | 95 |
| BATTERY 33 | 35 | 45 | 20 | — | — | LiI | PTFE | 1.68 | 100 | 97 |
| BATTERY 34 | 40 | 40 | 20 | | | | | 1.67 | 101 | 97 |
| BATTERY 35 | 60 | 20 | 20 | | | | | 1.67 | 102 | 96 |
| BATTERY 36 | 70 | 10 | 20 | | | | | 1.66 | 102 | 95 |

FIG.4

| | ELECTROLYTE | | | | | | | BINDER OF POSITIVE ELECTRODE | INITIAL VOLTAGE (V) | DISCHARGE PERFORMANCE (INDEX) | |
|---|---|---|---|---|---|---|---|---|---|---|---|
| | COMPOSITION OF SOLVENT (VOL%) | | | ADDITIVE (MASS%) | | SOLUTE | | | | INTERMEDIATE LOAD | HIGH LOAD |
| | DIOX | DME | THF | DMI | FIM | | | | | | |
| BATTERY 24 | 65 | 30 | 5 | — | — | LiI | PTFE | 1.73 | 104 | 97 |
| BATTERY 37 | 65 | 30 | 5 | — | — | LiTFSI | PTFE | 1.68 | 100 | 96 |
| BATTERY 38 | 65 | 30 | 5 | 0.05 | | LiI | PTFE | 1.65 | 104 | 97 |
| BATTERY 39 | 65 | 30 | 5 | 0.1 | | LiI | PTFE | 1.64 | 103 | 96 |
| BATTERY 40 | 60 | 30 | 10 | 0.1 | | LiI | PTFE | 1.63 | 103 | 96 |
| BATTERY 41 | 65 | 30 | 5 | 0.5 | | LiI | PTFE | 1.63 | 101 | 95 |
| BATTERY 42 | 65 | 30 | 5 | 1 | | LiI | PTFE | 1.62 | 100 | 95 |
| BATTERY 43 | 65 | 30 | 5 | | 0.05 | LiI | PTFE | 1.65 | 104 | 96 |
| BATTERY 44 | 65 | 30 | 5 | | 0.1 | LiI | PTFE | 1.64 | 103 | 97 |
| BATTERY 45 | 60 | 30 | 10 | | 0.1 | LiI | PTFE | 1.63 | 103 | 96 |
| BATTERY 46 | 65 | 30 | 5 | | 0.5 | LiI | PTFE | 1.63 | 102 | 95 |
| BATTERY 47 | 65 | 30 | 5 | | 1 | LiI | PTFE | 1.61 | 100 | 95 |
| BATTERY 48 | 65 | 30 | 5 | — | — | LiI | PVDF | 1.66 | 104 | 98 |
| BATTERY 49 | 65 | 30 | 5 | 0.05 | | LiI | PVDF | 1.63 | 105 | 98 |

LITHIUM PRIMARY BATTERY

RELATED APPLICATIONS

This application is the U.S. National Phase under 35 U.S.C. §371 of International Application No. PCT/JP2011/006115, filed on Nov. 1, 2011, which in turn claims the benefit of Japanese Application No. 2010-254115, filed on Nov. 12, 2010 the disclosures of which Applications are incorporated by reference herein.

TECHNICAL FIELD

The present invention relates to lithium primary batteries including iron disulfide as a positive electrode active material (hereinafter such lithium primary batteries are simply referred to as "lithium primary batteries" or "batteries").

BACKGROUND ART

Lithium primary batteries have an average discharge voltage of about 1.5 V, and thus have compatibility with other primary batteries having an average discharge voltage of about 1.5 V (for example, manganese dry batteries, alkaline dry batteries, or the like which are hereinafter referred to as "alkaline dry batteries, etc."). Thus, the lithium primary batteries are practically very useful. Moreover, iron disulfide (a positive electrode active material) has a theoretical capacity of about 894 mAh/g, and lithium (a negative electrode active material) has a theoretical capacity of about 3863 mAh/g. Accordingly, in the lithium primary batteries, both the theoretical capacity of the positive electrode active material and the theoretical capacity of the negative electrode active material are high, and thus the lithium primary batteries are practically very useful also as high-capacity light-weight primary batteries.

Coin-shaped (or button-shaped) lithium primary batteries and cylindrical lithium primary batteries are generally known. The coin-shaped lithium primary batteries are suitable for use in a low-load discharge region. Patent Document 1 describes that when a solvent of a nonaqueous electrolyte (hereinafter also referred to simply as "electrolyte") contains propylene carbonate and tetrahydrofuran (THF), a reduction in closed circuit voltage at a low temperature can be limited to a lesser degree.

In the cylindrical lithium primary batteries, a positive electrode and a negative electrode are wound with a separator interposed therebetween. Thus, areas of the positive electrode and the negative electrode which face each other are larger than those in the case of alkaline dry batteries, etc. Therefore, the cylindrical lithium primary batteries are suitable for use in a high-load discharge region. Patent Document 2 describes that when a solvent of an electrolyte contains dioxolane (DIOX) and 1,2-dimethoxyethane (DME), high-load discharge performance is improved.

The intermediate-load discharge performance of lithium primary batteries is comparable to that of alkaline dry batteries, etc. To provide lithium primary batteries offering greater convenience to users, improving the intermediate-load discharge performance is required in addition to improving high-load discharge performance. It is generally said that increasing the utilization ratio of a negative electrode in intermediate-load discharge is difficult in the lithium primary batteries. The reason for this is as described below. As discharge of the lithium primary batteries progresses, elution of lithium and elution of impurities such as sulfate ions from iron disulfide occur, and the lithium and the impurities are deposited on a surface of the negative electrode. In the intermediate-load discharge, an area having a great depth of discharge is also discharged (for example, the depth of discharge is 85%). Thus, at an end stage of the intermediate-load discharge, a reaction area of the negative electrode is reduced. Moreover, a discharge current in the intermediate-load discharge is not very small, so that when the reaction area of the negative electrode is reduced, the batteries are poorly discharged.

On the other hand, it is considered that remaining oxygen in the lithium primary batteries is reduced at a surface of a carbon material (a conductive agent) in a positive electrode, thereby generating potential. Thus, it is considered that mixed potential is generated at the positive electrode of the lithium primary batteries. Therefore, although iron disulfide exhibit a potential of about 1.7 V with respect to lithium metal, the initial voltage of the lithium primary batteries (hereinafter also referred to simply as "initial voltage") is higher than 1.7 V, and is about 1.8 V. The lithium primary batteries have such a high initial voltage, but the voltage of the lithium primary batteries (hereinafter also referred to simply as "battery voltage") is reduced to about 1.5 V for about several seconds after application of a current load to the lithium primary batteries. Thus, it has been thought that devices drivable by alkaline dry batteries, etc. (dry battery devices) can be driven by the lithium primary batteries without problems. However, in recent years, for example, some devices including built-in semiconductor integrated circuits, as typified by digital still cameras, have been driven by alkaline dry batteries, etc. When a power source of such a device is turned on, output voltages from the batteries are applied to the semiconductor integrated circuit for several tens of milliseconds immediately after the turning on the power source. Here, if the voltage of each cell which is higher than 1.65 V (e.g., 1.8 V) is applied to the semiconductor integrated circuit of the device configured to be driven by batteries having a specified voltage of 1.65 V or lower (that is, alkaline dry batteries, etc.), the semiconductor integrated circuit may be erroneously operated. Thus, it is difficult to drive devices including semiconductor integrated circuits by lithium primary batteries, and thus devices which can use lithium primary batteries as driving power sources are limited.

Note that Patent Document 3 describes that when an electrolyte of a coin-shaped lithium primary battery contains a predetermined amount of isoxazole derivatives, an initial open circuit voltage is reduced.

CITATION LIST

Patent Document

PATENT DOCUMENT 1: Japanese Patent Publication No. S57-174870
PATENT DOCUMENT 2: U.S. Pat. No. 5,290,414
PATENT DOCUMENT 3: Japanese Patent Publication No. S59-181464 (U.S. Pat. No. 479,744)

SUMMARY OF THE INVENTION

Technical Problem

When the technique of Patent Document 3 is used, intermediate-load discharge performance may be degraded. When the intermediate-load discharge performance is degraded, it becomes difficult to use lithium primary batteries in place of alkaline dry batteries, etc.

The present invention provides a lithium primary battery in which an initial voltage can be reduced while degradation in intermediate-load discharge performance is reduced.

Solution to the Problem

The present invention provides a lithium primary battery including iron disulfide as a positive electrode active material, wherein the composition of a solvent of an electrolyte is optimized so that an initial voltage can be reduced without degradation in intermediate-load discharge performance.

A nonaqueous solvent is used as the solvent of the electrolyte of the lithium primary battery. Various nonaqueous solvents include solvents easily reducible through electrochemical reaction in the lithium primary battery (solvents having low resistance to reduction). It is considered that these solvents are reduced on a side closer to a negative electrode, and control the surface potential of a positive electrode (reduce the surface potential of the positive electrode). It is considered that a reduced product of the solvent (a product obtained by reducing the solvent) influences reaction at a surface of the positive electrode. Specifically, it is said that polycarbonate (PC) or THF has lower resistance to reduction than DME, etc., and thus is reduced on the side closer to the negative electrode, thereby forming a coat on the surface of the positive electrode. The present inventors conducted a prior art search and various studies, and confirmed that THF is easily reduced on the side closer to the negative electrode immediately after formation of the lithium primary batteries. Thus, the present inventors assumed that using THF as the solvent of the electrolyte of the lithium primary batteries reduces the surface potential of the positive electrode immediately after the formation of the lithium primary batteries, thereby lowering the initial voltage.

However, it is said that using a solvent such as THF, etc. having low resistance to reduction as the solvent of the electrolyte degrades discharge performance for the reason, for example, that a reduced product of the solvent adheres to the surface of the positive electrode. Moreover, it is known that using THF as the solvent of the electrolyte degrades high-load discharge performance. Thus, it can be assumed that using THF as the solvent of the electrolyte degrades the intermediate-load discharge performance.

However, it is now found that optimizing the content of THF in the solvent of the electrolyte (hereinafter referred to as "THF content") reduces the initial voltage without degradation in intermediate-load discharge performance, and in some cases, the initial voltage is reduced while the intermediate-load discharge performance is improved. This is far beyond expectation based on the common technical knowledge that using THF as the solvent of the electrolyte degrades the high-load discharge performance, and cannot be expected from the common technical knowledge that using a solvent having low resistance to reduction as the solvent of the electrolyte may degrade the intermediate-load discharge performance. Moreover, the present inventors cannot say for sure but assume that the reason why such advantages are obtained is that the reduced product of THF prevents elution of impurities from the positive electrode active material.

Moreover, it was found that optimizing a material of a solute of the electrolyte further reduces the initial voltage, and further improves the intermediate-load discharge performance.

That is, the solvent of the electrolyte of the lithium primary battery according to the present invention contains DIOX and DME as main components, and further contains THF. The THF content is higher than 0 volume percent (vol. %) and lower than or equal to 20 vol. %.

Here, the present invention is primarily intended for improving the voltage (initial voltage) of a lithium primary battery immediately before used by a user without degradation in discharge performance. In general, fabricated lithium primary batteries are delivered to users after pre-discharge (also referred to as "initial discharge") and aging. Thus, in the present specification, the term "initial voltage" refers to a battery voltage after predetermined pre-discharge and aging but before use, and the term "discharge performance" refers to discharge performance of a lithium primary battery after the predetermined pre-discharge and aging. The discharge performance is, for example, discharge capacity or duration. Note that various conditions for the pre-discharge and the aging are known, but the present inventors consider that slight difference in conditions for the pre-discharge and the aging does not influence the significance of obtained advantages.

The description that "initial voltage is reduced," "reduction in initial voltage," "initial voltage can be reduced," or the like in the present specification means that the initial voltage is reduced to less than 1.80 V, is preferably 1.75 V or lower, and is more preferably 1.65 V or lower.

The description that "degradation in intermediate-load discharge performance is reduced," "degradation in intermediate-load discharge performance is prevented," or the like in the present specification means that the intermediate-load discharge performance is substantially the same as that in the case where the THF content is 0 vol. %.

The description that "intermediate-load discharge performance is improved," "intermediate-load discharge performance can be improved," or the like in the present specification means that the intermediate-load discharge performance is higher than that in the case where the THF content is 0 vol. % (for example, the discharge capacity is large, or the discharge duration is long).

The description that "intermediate-load discharge performance is degraded," "degradation in intermediate-load discharge performance is caused," or the like in the present specification means that the intermediate-load discharge performance is lower than that in the case where the THF content is 0 vol. % (for example, the discharge capacity is small, or the discharge duration is short). Note that the same definition as described above applies to "high-load discharge performance is degraded."

The description that "the solvent of the nonaqueous electrolyte contains DIOX and DME as main components" means that a small amount of a nonaqueous solvent other than DIOX, DME, and THF (another nonaqueous solvent, for example, PC) may be contained in the solvent of the electrolyte. However, the content of another nonaqueous solvent (when two or more types of nonaqueous solvents are used, the total content of the nonaqueous solvents) is preferably smaller than the smallest one of the content of DIOX in the solvent of the electrolyte (hereinafter referred to as "DIOX content"), the content of DME in the solvent of the electrolyte (hereinafter referred to as "DME content"), or the THF content, and in many cases, the content of other nonaqueous solvents is preferably smaller than the THF content.

Advantages of the Invention

According to the present invention, the initial voltage can be reduced while degradation in intermediate-load discharge performance is reduced, so that it is possible to provide a lithium primary battery having excellent convenience.

BRIEF DESCRIPTION OF THE DRAWINGS

FIG. 2 is a table illustrating results of a first example.
FIG. 3 is a table illustrating results of a second example.
FIG. 4 is a table illustrating results of a third example.

DESCRIPTION OF EMBODIMENTS

Figure 1:
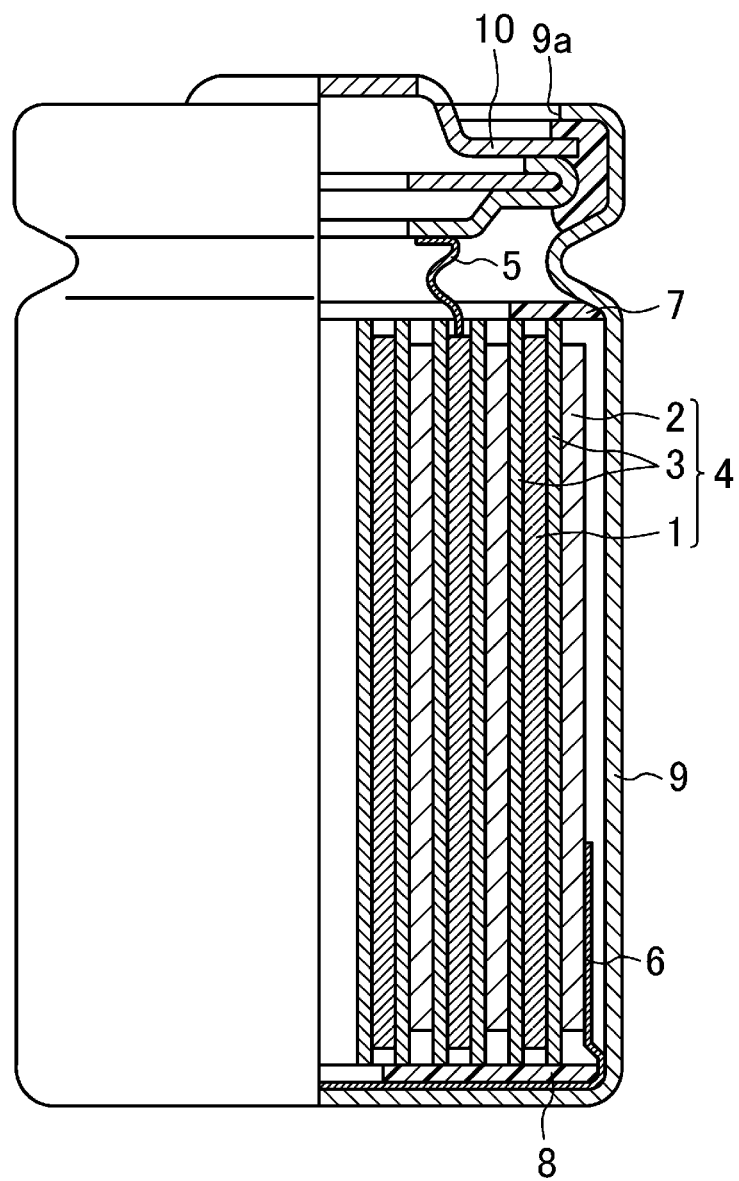
FIG. 1 is a half sectional view illustrating a lithium primary battery according to an embodiment of the present invention.

Embodiments of the present invention will be described in detail below with reference to the drawings. Note that the present invention is not limited to the embodiments below. The embodiments below can be modified without deviating from the effective scope of the present invention.

FIG. 1 is a half sectional view illustrating a lithium primary battery according to the present embodiment.

As illustrated in FIG. 1, the lithium primary battery according to the present embodiment includes an electrode group 4 formed by winding a positive electrode 1 and a negative electrode 2 with a separator 3 interposed between the positive electrode 1 and the negative electrode 2. The electrode group 4 is accommodated in a battery case 9 together with a nonaqueous electrolyte (not shown, for example, retained by the separator 3). An opening 9a of the battery case 9 is sealed with a sealing plate (positive electrode terminal) 10. The positive electrode 1 is connected to the sealing plate 10 via a positive electrode lead 5, and the negative electrode 2 is connected to a bottom surface of the battery case 9 via a negative electrode lead 6. Moreover, an upper insulating plate 7 is provided over the electrode group 4, and a lower insulating plate 8 is provided under the electrode group 4.

The positive electrode 1 includes a positive electrode current collector and a positive electrode mixture layer. The positive electrode current collector is foil or a substrate (for example, aluminum foil) made of a conductive material, and has a predetermined thickness. The positive electrode mixture layer is provided on a surface of the positive electrode current collector, and includes iron disulfide (a positive electrode active material), a conductive agent, and a binder. The iron disulfide may be pulverized natural ore (pyrite), or may be industrially synthesized. In both cases, elution of impurities such as sulfate ions from the positive electrode active material to the electrolyte occurs. As the conductive agent, an agent usually used in the field of lithium primary batteries can be used. The conductive agent may be graphite powder (e.g., natural graphite), or may be a mixture of graphite powder and carbon black (e.g., acetylene black). As the binder, a binder usually used in the field of lithium primary batteries can be used, and as described later, polyvinylidene fluoride (PVDF) is preferably used. However, the binder may be fluorine-based resin (e.g., polytetrafluoroethylene (PTFE), fluorinatedethylene-propylene (FEP) copolymer) other than PVDF, or may be styrene-butadienerubber (SBR). One of the above materials may be solely used, or two or more of the above materials may be combined.

The contents of the positive electrode active material, the conductive agent, and the binder in the positive electrode mixture layer are not specifically limited. For example, the amount of the conductive agent may be 2 parts by mass to 7 parts by mass, both inclusive per 100 parts by mass of the positive electrode active material, and the amount of the binder may be 1 part by mass to 6 parts by mass, both inclusive per 100 parts by mass of the positive electrode active material.

As the negative electrode 2, a negative electrode usually used in the field of lithium primary batteries can be used. The negative electrode 2 may be foil made of lithium, or may be foil made of a lithium alloy containing at least one of aluminum, magnesium, tin, or the like in a predetermined amount. However, when the negative electrode 2 is made of a lithium alloy, the negative electrode 2 can have strength. Alternatively, when the negative electrode 2 is made of a lithium alloy containing at least one of magnesium or tin, the impurities eluted from the positive electrode active material into the electrolyte can be prevented from depositing on a surface of the negative electrode 2.

As the separator 3, a separator usually used in the field of lithium primary batteries can be used. The separator 3 may have high ion permeability, predetermined mechanical strength, and predetermined insulating properties. The separator 3 may be, for example, nonwoven fabric, woven fabric, or a microporous film made of polyolefin.

The nonaqueous electrolyte contains a nonaqueous solvent and a solute. The nonaqueous solvent contains DIOX and DME as main components. The nonaqueous solvent further contains THF, and the THF content is higher than 0 vol. % and lower than or equal to 20 vol. %. Thus, an initial voltage is reduced without degradation in intermediate-load discharge performance.

DIOX and DME are resistant to reduction immediately after fabrication of the battery. Thus, when the THF content is 0 vol. %, the solvent of the electrolyte is resistant to reduction immediately after the fabrication of the battery. Therefore, immediately after the fabrication of the battery, the surface potential of the positive electrode 1 is poorly reduced, and a phenomenon in which the reduced product of the solvent adheres to a surface of the positive electrode 1 is less likely to occur. Thus, it is difficult to reduce the initial voltage.

When the THF content is higher than 0 vol. %, THF is reduced immediately after the fabrication of the battery, and a reduced product of THF adheres to the surface of the positive electrode 1. The potential of the reduced product of THF is lower than the potential of the positive electrode 1 before the reduced product of THF adheres to the positive electrode 1. Thus, when the reduced product of THF adheres to the surface of the positive electrode 1, the surface potential of the positive electrode 1 is reduced, which reduces the initial voltage of the lithium primary battery. When the initial voltage is 1.75 V or lower, erroneous operation of semiconductor integrated circuits included in dry battery devices in driving the dry battery devices by lithium primary batteries can be prevented in most of the dry battery devices. When the initial voltage is 1.65 V or lower, the initial voltage is lower than the specified voltage of alkaline dry batteries, etc., so that the dry battery devices including the semiconductor integrated circuits can be driven by the lithium primary batteries without problems.

As the TI-IF content increases, the rate of decrease in initial voltage increases. However, as the THF content increases, the amount of the reduced product of THF increases, which increases the amount of the reduced product of THF adhering to the surface of the positive electrode 1. When the THF content is 20 vol. % or lower, the amount of the reduced product of THF is not very large, and thus the reduced product of THF adheres to the surface of the positive electrode 1, which probably prevents the elution of the impurities from the positive electrode active material. Thus, at an end stage of intermediate-load discharge, a radical reduction in reaction area of the positive electrode 1 due to the reduced product of THF is prevented, and the impurities are prevented from eluting from the positive electrode active material so that the eluted impurities do not adhere to the negative electrode 2. Thus, at the end stage of the intermediate-load discharge, the reaction areas of both the positive electrode 1 and the negative electrode 2 are ensured to some extent, which lowers the degree of polarization, so that a radical reduction in battery voltage is prevented. Thus, degradation in intermediate-load discharge performance is reduced, and in some cases, the intermediate-load discharge performance is improved.

In contrast, when the THF content is higher than 20 vol. %, the amount of the reduced product of THF adhering to the surface of the positive electrode 1 further increases. Thus, the reduced product of THF not only prevents the elution of the impurities from the positive electrode active material but also significantly reduces the reaction area of the positive electrode 1. Thus, at the end stage of the intermediate-load discharge, the reaction area of the positive electrode 1 is reduced, so that the degree of polarization is higher than that in the case where the THF content is 0 vol. %. Therefore, the intermediate-load discharge performance is degraded.

Conventionally, it is said that adding THF to a solvent of an electrolyte degrades high-load discharge performance. However, as described above, when the THF content is optimized, the degradation in intermediate-load discharge performance can be prevented. The reason for this cannot be said for sure, but is probably as follows. As described above, in the intermediate-load discharge, the depth of discharge is larger than in high-load discharge, so that the discharge performance is easily influenced by the reduction in reaction area of the negative electrode. However, when THF is added to the solvent of the electrolyte, the impurities from the positive electrode 1 can be prevented from depositing on the negative electrode 2, so that the intermediate-load discharge performance is improved. Another reason is that in the intermediate-load discharge, a discharge current is smaller than in the high-load discharge. Thus, when the drift speed of lithium ions is lowered due to an increase in internal resistance, there is a case where the battery can be used in an intermediate-load discharge region even if the battery cannot be used in a high-load discharge region.

The THF content is preferably 1 vol. % to 10 vol. %, both inclusive. The THF content is more preferably 1 vol. % to 8 vol. %, both inclusive. Thus, advantages offered by THF can be sufficiently obtained, and degradation in the high-load discharge performance can be prevented.

When the THF content is lower than 1 vol. %, the amount of THF reduced on a side closer to the negative electrode 2 immediately after the fabrication of the battery is small compared to the case where the THF content is 1 vol. % or higher. Therefore, immediately after the fabrication of the battery, the amount of the reduced product of THF adhering to the surface of the positive electrode 1 is small. Thus, the surface potential of the positive electrode 1 is not so much reduced, and there is a case where the initial voltage of the lithium primary battery is not sufficiently reduced immediately after the fabrication of the battery.

When the THF content is higher than 8 vol. %, the amount of the reduced product of THF increases, and the amount of the reduced product of THF adhering to the positive electrode 1 also increases compared to the case where the THF content is 8 vol. % or lower. Thus, the initial voltage is reduced. However, the reaction area of the positive electrode 1 is reduced due to the increase of the amount of the reduced product of THF, which may lower the drift speed of lithium ions. This may degrade the high-load discharge performance, and the intermediate-load discharge performance may not be improved. However, even when the THF content is higher than 8 vol. %, the high-load discharge performance is less likely to be degraded as long as the THF content is 10 vol. % or lower, and the intermediate-load discharge performance is sufficiently improved practically.

Moreover, the THF content is more preferably 5 vol. % or higher. When the THF content is lower than 5 vol. %, the amount of the reduced product of THF adhering to the surface of the positive electrode 1 immediately after the fabrication of the battery is small, so that the surface potential of the positive electrode 1 is not so much reduced, and the initial voltage of the lithium primary battery may be poorly reduced immediately after the fabrication of the battery.

The DIOX content and the DME content are not specifically limited. The DIOX content and the DME content may be determined by considering, for example, that the THF content is higher than 0 vol. % and lower than or equal to 20 vol. %, and the solvent of the nonaqueous electrolyte contains DIOX and DME as main components. However, the DIOX content is preferably 40 vol. % to 80 vol. %, both inclusive, and more preferably 50 vol. % to 70 vol. %, both inclusive. Moreover, the DME content is preferably 20 vol. % to 60 vol. %, both inclusive, and more preferably 25 vol. % to 45 vol. %, both inclusive. Most preferably, DIOX:DME=3:2 (volume ratio). Thus, advantages offered by THF can be sufficiently obtained, and degradation in high-load discharge performance can be prevented.

In general, DIOX is used to prevent the elution of the impurities from the positive electrode active material into the electrolyte, and DME is used to increase conductivity of the lithium ions. For this reason, when the DIOX content is low (lower than 40 vol. %), the elution of the impurities from the positive electrode active material is poorly prevented, and thus the intermediate-load discharge performance may not be improved. Thus, the significance that the solvent of the electrolyte contains THF may be ignored (there is a case where advantages by THF cannot be obtained). In contrast, when the DIOX content is too high (higher than 80 vol. %), the DME content is reduced (lower than 20 vol. %), which may lower the drift speed of the lithium ions in the nonaqueous electrolyte, that is, may degrade the high-load discharge performance.

Note that the solvent of the nonaqueous electrolyte may contain DIOX, DME, and THF.

It is preferable that 3,5-dimethylisoxazole (hereinafter referred to as "DMI") be added to the solvent of the nonaqueous electrolyte. The ratio of DMI added to the solvent of the nonaqueous electrolyte (hereinafter referred to as "DMI additive ratio") is preferably 0.5 percent by mass (mass %) or lower, and more preferably 0.05 mass % to 0.5 mass %, both inclusive. Thus, advantages offered by THF can be sufficiently obtained, and degradation in high-load discharge performance can be prevented.

DMI is easily reducible on the side closer to the negative electrode 2 immediately after the fabrication of the lithium primary battery. Thus, as the DMI additive ratio increases, the surface potential of the positive electrode 1 is further reduced. However, as the DMI additive ratio increases, a reduced product of DMI is deposited on the surface of the positive electrode 1, which reduces the reaction surface of the positive electrode 1. Moreover, when the DMI additive ratio increases, the internal resistance increases, which may lower the drift speed of the lithium ions. As described above, on the point that the initial voltage is reduced, DMI acts in a similar manner to THF, but on the point that the degradation of discharge performance is reduced, DIM acts differently from THF (Battery 2 of FIG. 2). Based on the above description, the DMI additive ratio may be determined. When DMI additive ratio is higher than 0.5 mass %, the intermediate-load discharge performance may not be improved, and the significance that the solvent of the electrolyte contains THF may be ignored (Battery 41 of FIG. 4). Alternatively, when the DMI additive ratio is lower than 0.05 mass %, the initial voltage may not be further reduced.

For a similar reason, phthalimide (hereinafter referred to as "FIM") is preferably added to the solvent of the nonaqueous electrolyte, and the FIM additive ratio is preferably 0.5 mass % or lower, and more preferably 0.05 mass % to 0.5 mass %, both inclusive. Note that both DMI and FIM may be added to the solvent of the nonaqueous electrolyte. In this case, the total of the DMI additive ratio and the FIM additive ratio is preferably 0.5 mass % or lower, and more preferably 0.05 mass % to 0.5 mass %, both inclusive.

The solute of the nonaqueous electrolyte may be a lithium salt, may be lithium iodide (LiI), lithium fluoroborate, or the like, or may be a lithium salt containing an imide bond such as lithium bis(trifluoromethanesulfonyl)imide (LiTSFI). However, when the solute is LiI, the intermediate-load discharge performance is significantly improved, and the high-load discharge performance is further improved. The reason for this is probably as follows.

Dissociation of LiI in the solvent of the nonaqueous electrolyte produces iodide ions. In some cases, the iodide ions react with a small amount of water entering the battery. The reaction can probably prevent the impurities eluted from the positive electrode active material from adhering, as inert components, to the surface of the negative electrode 2 to adversely influence the negative electrode 2, or the like. This is probably because water participates in the reaction in which the impurities are changed into inert substances on the surface of the negative electrode 2. Thus, when lithium iodide is included in the solvent, the adverse influence of the impurities on the negative electrode 2, or the like is reduced, so that the intermediate-load discharge performance is significantly improved.

The binder of the positive electrode 1 is preferably PVDF. Thus, the surface potential of the positive electrode 1 is further reduced. The reason for this cannot be said for sure, but is probably as follows. PVDF is easily swollen with an organic solvent. Thus, when PVDF is used as the binder of the positive electrode 1, it is easy to maintain a state in which a reduced product of THF or DMI adheres to the surface of the positive electrode 1 compared to the case where other materials are used as the binder of the positive electrode 1. Thus, the initial voltage is further reduced.

As described above, the solvent of the electrolyte of the present embodiment contains DIOX and DME as main components, and further contains THF. Moreover, the THF content is higher than 0 vol. % and lower than or equal to 20 vol. %. Thus, the initial voltage is reduced, and degradation in intermediate-load discharge performance can be prevented. THF is selected among solvents having low resistance to reduction, and the THF content is higher than 0 vol. % and lower than or equal to 20 vol. %. Therefore, contrary to conventional expectations, it is possible to simultaneously obtain the advantage of reducing the initial voltage and the advantage of preventing degradation in intermediate-load discharge performance.

The present embodiment may have the following configuration.

As long as the advantages described in the above-described embodiment can be obtained, the solvent of the nonaqueous electrolyte may contain a small amount of additives other than DMI and FIM, and the nonaqueous electrolyte may contain a small amount of a lithium salt (e.g., LiTSFI) other than LiI as the solute.

It is provided that the solvent of the nonaqueous electrolyte contains DIOX and DME as main components. If the solvent of the nonaqueous electrolyte does not contain at least one of DIOX or DME as a main component, at least one of the intermediate-load discharge performance or the high-load discharge performance is significantly degraded (Battery 3 of FIG. 2).

The injection rate of the nonaqueous electrolyte may be accordingly set based on the size, or the like of the lithium primary battery, and is not limited to values of later described examples.

The concentration of the solute in the nonaqueous electrolyte may be accordingly set based on application of the lithium primary battery, and is not limited to values of the later described examples.

Components other than the nonaqueous electrolyte of the lithium primary battery are not limited to the description in the above embodiment and the later described examples, and may be accordingly set. For example, the sizes of the positive electrode 1, the negative electrode 2, and the separator 3 are not limited to values of the later described examples. Moreover, the configurations (materials, thicknesses, sizes, etc.) of the positive electrode lead 5, the negative electrode lead 6, the upper insulating plate 7, the lower insulating plate 8, the battery case 9, and the sealing plate 10 are not specifically limited. Moreover, when the negative electrode 2 is made of a lithium alloy, types and contents of metal other than lithium (metal alloyed with lithium) contained in the negative electrode 2 may be accordingly set as necessary, and are not limited to values of the later described examples.

The positive electrode current collector may be expanded metal, and in this case, a positive electrode mixture may be filled in openings of the expanded metal. Alternatively, the positive electrode current collector may be aluminum foil.

The lithium primary battery according to the present embodiment is compatible with an alkaline dry battery, etc. That is, application of lithium primary battery according to the present embodiment is not limited to power sources for driving devices including semiconductor integrated circuits.

EXAMPLES

First Example

In a first example, the THF content was optimized. Specifically, lithium primary batteries (Batteries 1-15) which were different from each other only in composition of electrolytes were fabricated, and each of the lithium primary batteries was subjected to initial-voltage measurement, an intermediate-load discharge test, and a high-load discharge test.

[Fabrication of AA Lithium Primary Battery]

(1) Battery 1

First, iron disulfide (a positive electrode active material), ketjen black (a conductive agent), and PTFE (a binder) were mixed with each other in 94.0:3.5:2.5 (mass ratio), thereby producing a positive electrode mixture. The positive electrode mixture was applied to both surfaces of aluminum foil (a positive electrode current collector), was dried, and then, was rolled. Thus, a positive electrode 1 was obtained, wherein the width of the positive electrode 1 was 44 mm, an electrode plate of the positive electrode 1 had a length of 220 mm, and a thickness of the positive electrode 1 was 0.145 mm.

Next, a negative electrode 2 made of a lithium alloy containing 200 ppm of aluminum was prepared. Here, the thickness of the negative electrode 2 was set so that the theoretical capacity ratio per unit area of parts of the positive electrode 1 and the negative electrode 2 which face each other (theoretical capacity of negative electrode 2/theoretical capacity of positive electrode 1) was 0.80. Note that the thickness of the negative electrode 2 was computed, where the theoretical capacity of iron disulfide was 894 mAh/g. Moreover, a separator 3 made of a polyethylene microporous film having a thickness of 25 μm was prepared. Then, the separator 3 was sandwiched between the positive electrode 1 and the negative electrode 2, and was wound. Thus, an electrode group 4 having an outer diameter of 13.1 mm was obtained. In the obtained electrode group 4, a positive electrode lead 5 connected to the positive electrode 1 was drawn from one end face of the electrode group 4, and a negative electrode lead 6 connected to the negative electrode 2 was drawn from the other end face of the electrode group 4.

Subsequently, DIOX and DME were mixed with each other so that DIOX:DME=3:2 (volume ratio), thereby preparing a solvent. LiI was dissolved in the mixed solvent to produce an electrolyte having a LiI concentration of 1.0 mol/L.

Subsequently, the electrode group 4 was accommodated in a battery case 9 together with a predetermined amount (2.0 ml) of the electrolyte, the negative electrode lead 6 was connected to a bottom surface of the battery case 9, and the positive electrode lead 5 was connected to a sealing plate 10. Then, an opening 9a of the battery case 9 was sealed with the sealing plate 10 via a gasket. Battery 1 was thus fabricated.

(2) Batteries 2-15

Batteries 2-15 were fabricated by a method similar to that for fabricating Battery 1 except the composition of the solvent of the electrolyte (see FIG. 2). Note that "3Me2Ox" in FIG. 2 is 3-Methyl-2-oxazolidone. Moreover, in Batteries 5-11 and Battery 13, (DIOX):(DME)=3:2 (volume ratio).

[Pre-discharge and Aging]

Battery 1 was pre-discharged by 3% of the theoretical capacity of the positive electrode 1 for 6-18 hours after the fabrication. A current in the pre-discharge was 15% of the theoretical capacity of the positive electrode 1 (for example, 600 mA in a 4000 mAh design). The pre-discharged battery was stored at 30° C. for 6 days (aging). Batteries 2-15 were likewise processed.

[Measurement of Initial Voltage]

Battery voltages of Batteries 1-15 after the aging were measured at 20° C. by using MODEL3455 manufactured by TSURUGA ELECTRIC CORPORATION. The result of the measurement is shown in "initial voltage" in FIG. 2.

[Discharge Test]

(1) Intermediate-Load Discharge Test

Batteries 1-15 after the aging were discharged at a constant current of 100 mA in a 20° C. atmosphere to measure a discharge capacity (mAh) until a closed circuit voltage reached 0.9 V. The ratio of the discharge capacity of each battery to the discharge capacity of Battery 1 was computed. The result of the computation is shown in "intermediate load" of "discharge performance" of FIG. 2.

(2) High-Load Discharge Test

Batteries 1-15 after the aging were discharged at a constant current of 1000 mA in a 20° C. atmosphere to measure a discharge capacity (mAh) until a closed circuit voltage reached 1.1 V. The ratio of the discharge capacity of each battery to the discharge capacity of Battery 1 was computed. The result of the computation is shown in "high load" of "discharge performance" of FIG. 2.

[Results and Discussion]

The result is shown in FIG. 2. Batteries having an initial voltage of 1.75 V or lower, intermediate-load discharge performance (index) of 100 or higher, and high-load discharge performance (index) of 95 or higher were determined to be preferable batteries.

As can be seen from FIG. 2, when the THF content was 0 vol. %, the initial voltage was not reduced (Battery 1). When DMI was added to the solvent of the electrolyte, the initial voltage was reduced to 1.75 V or lower, but the discharge performance was also degraded (Battery 2). From the result, it was confirmed that the technique described in Patent Document 3 causes degradation in discharge performance. When DMI was added to the solvent of the electrolyte containing 3Me2Ox, the initial voltage was hardly reduced, but the discharge performance was reduced (Batteries 3-4). In particular, since the DIOX content of Battery 3 was 0 vol. %, the intermediate-load discharge performance was significantly degraded.

Moreover, when the THF content was higher than 20 vol. %, the initial voltage was reduced to 1.75 V or lower, but the index of the intermediate-load discharge performance was lower than 100, and the index of the high-load discharge performance was lower than 95 (Batteries 11-15). A similar result was obtained even when the volume ratio of DIOX to DME was varied (Battery 11 and Battery 12). Note that since the DIOX content of Battery 15 was lower than 40 vol. %, the intermediate-load discharge performance was significantly degraded.

In contrast, when the THF content was higher than 0 vol. % and lower than or equal to 20 vol. %, the initial voltage was reduced to 1.75 V or lower, the intermediate-load discharge performance was improved, and the high-load discharge performance was 95 or higher (Batteries 5-10). Alternatively, when the THF content was 5 vol. % to 10 vol. %, both inclusive, the intermediate-load discharge performance was significantly improved, and the high-load discharge performance was 97 or higher. The reason for such results is as described in the embodiment above. Here, when an increasing amount of the index of the discharge performance is greater than or equal to 3 (for example, 100 is increased to 103 or greater), this means that the discharge performance is significantly improved.

Second Example

In a second example, the DIOX content and the DME content were optimized.

[Experiment Method]

Batteries 16-36 of FIG. 3 were fabricated by a method similar to that for fabricating Battery 1 of the first example except that the DIOX content and the DME content were different from those of the first example. The batteries were pre-discharged and aged according to the method described in the first example, and then were subjected to initial-voltage measurement, an intermediate-load discharge test, and a high-load discharge test.

[Results and Discussion]

The result is shown in FIG. 3. Batteries having an initial voltage of 1.75 V, intermediate-load discharge performance (index) of 100 or higher, and high-load discharge performance (index) of 95 or higher were determined to be preferable batteries.

As illustrated in FIG. 3, when the DIOX content was lower than 40 vol. %, it was difficult to improve the intermediate-load discharge performance, and when the DME content was lower than 20 vol. %, the high-load discharge performance was degraded. The reason for such results is as described in the embodiment above.

Even with the same THF content, different initial voltages were obtained when the DIOX content or the DME content were varied. This is probably because DIOX and DME influence reduction reaction of THF.

Even with the same THF content, different discharge performance was obtained when the DIOX content or the DME content were varied. This is probably because DIOX easily influences the intermediate-load discharge performance, and DME easily influences the high-load discharge performance.

Third Example

In a third example, a solute of an electrolyte, an additive to a solvent of the electrolyte, and a binder of a positive electrode 1 were optimized. The solute, the additive, and the binder will be sequentially described below.

[Solute of Electrolyte]

Battery 37 of FIG. 4 was fabricated by a method similar to that for fabricating Battery 24 except that the solute of the electrolyte was different from that of Battery 24. According to the method described in the first example, the batteries were pre-discharged and aged, and then were subjected to the initial voltage measurement and the discharge tests.

As illustrated in FIG. 4, Battery 24 had better intermediate-load discharge performance and better high-load discharge performance than Battery 37. The reason for such a result is as described in the embodiment.

[Additive to Solvent of Electrolyte]

Batteries 38-42 illustrated in FIG. 4 were fabricated by a method similar to that for fabricating Battery 24 except that DMI was added to the solvent of the electrolyte. Moreover, Batteries 43-47 illustrated in FIG. 4 were fabricated by a method similar to that for fabricating Battery 24 except that FIM was added to the solvent of the electrolyte. According to the method described in the first example, the batteries were pre-discharged and aged, and then were subjected the initial voltage measurement, and the discharge tests.

As illustrated in FIG. 4, as the additive ratio of DMI increased, the initial voltage was further reduced. However, when the additive ratio of DMI was higher than 0.5 mass %, it was difficult to improve the intermediate-load discharge performance. The same result was obtained as to the additive ratio of FIM. The reason for such results is as described in the embodiment.

Although detailed description is omitted, also in Batteries other than Battery 24 (e.g., Batteries 5-10 of FIG. 2, and Batteries of FIG. 3), the initial voltage was further reduced, and degradation in intermediate-load discharge performance was reduced when the additive ratio of DMI or FIM was 0.05 mass % to 0.5 mass %, both inclusive.

[Binder of Positive Electrode 1]

Battery 48 and Battery 49 illustrated in FIG. 4 were fabricated by methods similar to those for fabricating Battery 24 and Battery 38 except that PVDF was used as the binder of the positive electrode 1. According to the method described in the first example, the batteries were pre-discharge and aged, and then were subjected to the initial voltage measurement and the discharge tests.

As illustrated in FIG. 4, the initial voltage was lower in Battery 48 than in Battery 24, and lower in Battery 49 than in Battery 38. The reason for such a result is as described in the embodiment.

Although detailed description is omitted, also in batteries other than Battery 24 and Battery 38 (e.g., Batteries 5-10 of FIG. 2, and Batteries of FIG. 3), the initial voltage was further reduced when PVDF was used as the binder of the positive electrode 1.

INDUSTRIAL APPLICABILITY

As described above, the present invention is useful to lithium primary batteries compatible with alkaline dry batteries, etc., and is also useful as batteries for driving dry battery devices including semiconductor integrated circuits.

DESCRIPTION OF REFERENCE CHARACTERS

1 Positive Electrode
2 Negative Electrode
3 Separator
4 Electrode Group
5 Positive Electrode Lead
6 Negative Electrode Lead
7 Upper Insulating Plate
8 Lower Insulating Plate
9 Battery Case
9a Opening
10 Sealing Plate

The invention claimed is:

1. A lithium primary battery comprising:
a positive electrode including iron disulfide as a positive electrode active material;
a negative electrode including lithium as a negative electrode active material;
an electrode group formed by winding the positive electrode and the negative electrode with a separator provided between the positive electrode and the negative electrode; and
a nonaqueous electrolyte, wherein
a solvent of the nonaqueous electrolyte contains dioxolane and 1,2-dimethoxyethane as main components, and further contains tetrahydrofuran, and
a content of the tetrahydrofuran in the solvent is equal to or greater than 1 volume percent (vol. %) and equal to or lower than 8 vol. %.

2. The lithium primary battery of claim 1, wherein:
a content of the dioxolane in the solvent is equal to or greater than 40 vol. % and equal to or lower than 80 vol. %, or
a content of the 1,2-dimethoxyethane in the solvent is equal to or greater than 20 vol. % and equal to or lower than 60 vol. %.

3. The lithium primary battery of claim 2, wherein
the solvent of the nonaqueous electrolyte consists of dioxolane, 1,2-dimethoxyethane, and tetrahydrofuran.

4. The lithium primary battery of claim 1, wherein
the nonaqueous electrolyte contains lithium iodide.

5. The lithium primary battery of claim 1, wherein
the solvent further contains at least one of 3,5-dimethyl isoxazole or phthalimide in a ratio of equal to or greater than 0.05 percent by mass (mass %) and equal to or lower than 0.50 mass %.

6. The lithium primary battery of claim 1, wherein
a binder of the positive electrode is polyvinylidene fluoride.

* * * * *